United States Patent
Nemeth et al.

(10) Patent No.: US 10,883,482 B2
(45) Date of Patent: Jan. 5, 2021

(54) COMPRESSED AIR SYSTEM FOR A MOTOR VEHICLE

(71) Applicant: KNORR-BREMSE Systeme fuer Nutzfahrzeuge GmbH, Munich (DE)

(72) Inventors: Huba Nemeth, Budapest (HU); Tamas Adler, Budapest (HU)

(73) Assignee: KNORR-BREMSE Systeme fuer Nutzfahrzeuge GmbH, Munich (DE)

(*) Notice: Subject to any disclaimer, the term of this patent is extended or adjusted under 35 U.S.C. 154(b) by 964 days.

(21) Appl. No.: 14/642,868

(22) Filed: Mar. 10, 2015

(65) Prior Publication Data
US 2015/0176575 A1 Jun. 25, 2015

Related U.S. Application Data

(63) Continuation of application No. PCT/EP2013/068553, filed on Sep. 9, 2013.

(30) Foreign Application Priority Data

Sep. 12, 2012 (EP) .................................. 12184115

(51) Int. Cl.
F04B 35/04 (2006.01)
F04B 49/02 (2006.01)

(52) U.S. Cl.
CPC ............ *F04B 35/04* (2013.01); *F04B 49/022* (2013.01); *F04B 2203/0201* (2013.01);
(Continued)

(58) Field of Classification Search
CPC .................. F04B 49/022; F04B 49/065; F04B 2203/0201; F04B 2203/0202;
(Continued)

(56) References Cited

U.S. PATENT DOCUMENTS

| 5,275,012 A | 1/1994 | Dage et al. |
| 6,036,449 A | 3/2000 | Nishar et al. |

(Continued)

FOREIGN PATENT DOCUMENTS

| CN | 101094782 A | 12/2007 |
| CN | 101896383 A | 11/2010 |

(Continued)

OTHER PUBLICATIONS

Machine Translation of DE102008006860.*
(Continued)

*Primary Examiner* — Christopher S Bobish
(74) *Attorney, Agent, or Firm* — Crowell & Moring LLP

(57) ABSTRACT

A compressed air system for a motor vehicle with an air supply system includes an electric drive motor, which can be controlled for variable speed, an air compressor coupled to be driven by the electric drive motor, an electric power supply for supplying electric power to the electric drive motor, at least one air reservoir connected with the air compressor to receive air from the air compressor, an air utilization system connected to the air reservoir to receive air from the air reservoir, and a controller to control the speed of the electric drive motor. The controller controls the electric drive motor to determine its speed depending upon at least one of the following signals: a signal representing the activation status of an accelerator pedal of the vehicle, a signal representing the speed of the vehicle, a signal representing the temperature of the power supply, a signal representing the temperature of the electric drive motor, a signal representing the wetness level of the air compressed by the air compressor, a signal representing the load of the air compressor, a signal representing the running time of the air compressor, or a signal representing the status of the electric power supply.

2 Claims, 13 Drawing Sheets

(52) U.S. Cl.
CPC .......... F04B 2203/0202 (2013.01); F04B 2203/0209 (2013.01); F04B 2205/063 (2013.01); F04B 2207/01 (2013.01); F04B 2207/0421 (2013.01); F04B 2207/0422 (2013.01)

(58) Field of Classification Search
CPC ........ F04B 2203/0209; F04B 2205/063; F04B 2207/01; F04B 2207/0421; F04B 2207/0422
USPC .................................................. 417/44.1, 36
See application file for complete search history.

(56) References Cited

U.S. PATENT DOCUMENTS

| | | | | |
|---|---|---|---|---|
| 6,234,586 | B1* | 5/2001 | Davis ............... | B60R 25/08 303/89 |
| 7,431,406 | B2* | 10/2008 | Aumuller .......... | B60T 7/10 303/15 |
| 7,454,922 | B2* | 11/2008 | Zeigler ............. | B60H 1/00378 123/41.19 |
| 7,632,076 | B2* | 12/2009 | Seitz ................. | B60T 17/02 417/1 |
| 8,371,275 | B2* | 2/2013 | Gerum ............... | F02B 33/44 123/559.1 |
| 9,206,793 | B2* | 12/2015 | Lee .................... | F04B 17/05 |
| 2004/0136840 | A1 | 7/2004 | Doerr et al. | |
| 2004/0151606 | A1 | 8/2004 | Doerr et al. | |
| 2007/0131408 | A1 | 6/2007 | Zeigler et al. | |
| 2008/0093154 | A1 | 4/2008 | Gerum | |
| 2008/0292471 | A1* | 11/2008 | Sweet ............... | F04B 49/065 417/32 |
| 2009/0056354 | A1 | 3/2009 | Davis et al. | |
| 2009/0087319 | A1 | 4/2009 | Russold et al. | |
| 2009/0090118 | A1 | 4/2009 | Pham et al. | |
| 2009/0153143 | A1 | 6/2009 | Haeffner et al. | |
| 2009/0254246 | A1 | 10/2009 | Yang et al. | |
| 2011/0011663 | A1 | 1/2011 | Hebrard | |
| 2011/0194948 | A1 | 8/2011 | Kley et al. | |
| 2011/0231047 | A1* | 9/2011 | Aixala ................ | B60T 17/02 701/22 |
| 2013/0280095 | A1* | 10/2013 | Worden .............. | F04B 25/00 417/1 |

FOREIGN PATENT DOCUMENTS

| | | |
|---|---|---|
| DE | 693 10 215 T2 | 7/1997 |
| DE | 199 13 248 A1 | 10/1999 |
| DE | 102 07 803 A1 | 4/2004 |
| DE | 10 2004 021 242 A1 | 11/2005 |
| DE | 10 2004 045 123 B3 | 3/2006 |
| DE | 10 2005 013 027 A1 | 10/2006 |
| DE | 10 2008 006 860 A1 | 8/2009 |
| DE | 10 2010 025 890 A1 | 1/2012 |
| EP | 0 335 086 A1 | 10/1989 |
| EP | 1 394 415 A2 | 3/2004 |
| EP | 1 183 172 B1 | 12/2005 |
| EP | 2 073 029 A1 | 6/2009 |
| JP | 2005-233164 A | 9/2005 |
| WO | WO 2006/004493 A1 | 1/2006 |
| WO | WO 2006/071170 A1 | 7/2006 |
| WO | WO 2009/043405 A1 | 4/2009 |
| WO | WO 2011/138358 A1 | 11/2011 |

OTHER PUBLICATIONS

Chinese Office Action issued in counterpart Chinese Application No. 201380053316.0 dated Jun. 3, 2016 (five pages).
European Notice of Opposition issued in counterpart European Application No. 12184115.9 dated Jun. 6, 2016 (30 pages).
European Invitation to File Observations and Amendments issued in counterpart European Application No. 12184115.9 dated Jul. 4, 2016 (one page).
Extended European Search Report dated Jul. 25, 2013 (Four (4) pages).
International Search Report (PCT/ISA/210) dated Oct. 15, 2013 (Two (2) pages).
International Preliminary Report on Patentability (PCT/IB373) and Written Opinion (PCT/ISA/237) dated Mar. 17, 2015 (Four (4) pages).

* cited by examiner

FIG: 12

COMPRESSED AIR SYSTEM FOR A MOTOR VEHICLE

CROSS REFERENCE TO RELATED APPLICATIONS

This application is a continuation of PCT International Application No. PCT/EP2013/068553, filed Sep. 9, 2013, which claims priority under 35 U.S.C. § 119 from European Patent Application No. 12184115.2, filed Sep. 12, 2012, the entire disclosures of which are herein expressly incorporated by reference.

BACKGROUND AND SUMMARY OF THE INVENTION

The present invention relates to a compressed air system for a motor vehicle with an air supply system, particularly for use in commercial road vehicles.

Electrically driven compressors of the above-mentioned type are known, for example, from US 2009/0254246 A1. As described there, an internal combustion engine drives a DC-generator to charge a battery which is connected to the electric drive motor of the compressor. The compressor is connected through an air treatment unit with an air reservoir. An air system controller controls the electric drive motor of the compressor.

If the air pressure in the air system reservoir is less than a set minimum value, the air system controller starts the motor and air compressor to charge the air reservoir, running the motor at higher speeds. As pressure increases in the air reservoir, motor speed is held constant or ramped down. When the pressure in the air reservoir increases to a set maximum value, the air system controller sets the drive motor and the compressor to shut off, which stops the air charging operation.

Further, an operation of an air brake system stops the action of the drive motor and the compressor, to save energy when the air brake system is discharging air to stop the vehicle.

Also, the temperature of the compressor can be considered to control the speed of the drive motor of the compressor.

Thus, the speed of the drive motor of the compressor is variable based upon the pressure in the air system reservoir and upon certain operation parameters of the vehicle.

The object of the invention is to decrease the power consumption of the drive motor of the compressor, so that fuel can be saved and emissions decreased.

This and other objects are achieved according to the invention by providing a compressed air system for a motor vehicle with an air supply system, comprising:
  an electric drive motor, which can be controlled for variable speed,
  an air compressor coupled to be driven by the electric drive motor,
  an electric power supply for supplying electric power to the electric drive motor,
  at least one air reservoir connected with said air compressor to receive air from the air compressor,
  an air utilization system connected to said at least one air reservoir to receive air from said at least one air reservoir, and
  a controller to control the speed of the electric drive motor.

The invention is characterized in that the controller controls the electric drive motor to determine the speed of the electric drive motor depending upon at least one signal out of the following signals:
  a signal representing the activation status of an accelerator pedal of the vehicle,
  a signal representing the speed of the vehicle,
  a signal representing the temperature of the power supply,
  a signal representing the temperature of the electric drive motor,
  a signal representing the wetness level of the air compressed by the air compressor,
  a signal representing the load of the air compressor,
  a signal representing the running time of the air compressor, or
  a signal representing the status of the electric power supply.

In other words, the determination of the speed of the electric drive motor for driving the compressor depends upon signals representing the vehicle status, such as signals of a controller area network of the vehicle, accelerator pedal signals, brake pedal signals, vehicle speed signals, temperature signals of the electric power supply or power stage, temperature signals of the electric motor, upon signals describing the status of the compressed air system (pressure level, wetness level, compressor duty, compressor running time etc.), upon signals representing the status of the electric power supply (status of charge, status of function, status of availability) and the status of the electric power network (current, voltage).

The calculation of the speed of the electric drive motor of the compressor is preferably based on a function approximation and/or a look-up table for air flow-rate and power consumption maps of the compressor as a function of compressor speed and back pressure, which are determined by a measurement, vehicle tests or theoretical considerations. With this, the power consumption of the electric drive motor of the compressor can be decreased.

Preferably, the electric power supply, the controller and the electric drive motor are connected by an electric power supply network. The controller controls the electric drive motor to determine the speed of the electric drive motor depending upon a signal representing the status of the electric power supply network. Such a signal is preferably the voltage and/or the conducted current.

According to a preferred embodiment, the speed of the electric drive motor is determined based upon at least one function and/or upon at least one look-up table, where at least one of the aforesaid signals is an input variable for the at least one function and/or the least one look-up table.

Further, the speed of the electric drive motor can be determined based upon the air consumption of the compressed air system of the vehicle.

According to another aspect, the speed of the electric drive motor is controlled by the controller in such a way, that, if the pressure level in the air reservoir is lower than a minimum level and if the power stage of the electric power supply reaches or exceeds a set power stage limit, then the electric drive motor is operated with its maximum speed until the pressure level in the air reservoir reaches a cut off pressure level. Or, if the pressure level in the air reservoir is below a set pressure limit and if the power stage of the electric power supply is below the set power stage limit, then the electric drive motor is operated with a speed between zero speed and its maximum speed, until the pressure level in the air reservoir reaches the cut off pressure level.

Preferably, the speed of the electric drive motor is controlled by the controller in such a way, that, if the pressure in the air system reservoir is below a set pressure limit, then the electric drive motor is controlled to operate with a speed calculated to cover the actual air consumption of the compressed air system, until the pressure level in the air reservoir reaches a set cut off pressure level.

According to a further embodiment, the speed of the electric drive motor is controlled by the controller in such a way, that, if the pressure in the air system reservoir is below a set pressure limit, then the electric drive motor is operated with a speed calculated to cover the current air consumption of the compressed air system, until the pressure level in the air reservoir reaches a cut off pressure level, which is higher than a normal cut off pressure level to store more energy in the compressed air system.

Further, the speed of the electric drive motor can be controlled by the controller in such a way, that, if the power stage of the electric power supply is below a set power stage limit, or if the temperature of the electric drive motor exceeds a critical temperature limit, or if the actual speed of the electric drive motor is not equal to a demanded speed, then the electric drive motor will be stopped.

Preferably, the electric drive motor is controlled by the controller in such a way, that, if the compressor is switched offload and the actual speed of the electric drive motor of the compressor is higher than zero, then the electric drive motor is operated in a generator mode to charge the electric power supply until a set or predetermined charge level of the electric power supply is reached.

According to another aspect, the electric drive motor is controlled by the controller in such a way, that, if an accelerator pedal of the drive engine of the vehicle is kicked down and the charge status of the electric power supply exceeds a set charge limit and the consumption of electric power is above a set consumption limit, then the electric drive motor of the compressor is controlled to operate with a calculated speed lower than its maximum speed until the pressure in the air system reservoir reaches a set cut off pressure level.

Further, the electric drive motor can be controlled by the controller in such a way, that, if the ambient temperature is below a set ambient temperature, then the electric drive motor is controlled to operate with a set calculated speed until the pressure level in the air system reservoir reaches a cut off pressure level.

According to another embodiment, the electric drive motor is controlled by the controller in such a way, that, if the temperature of the electric drive motor is above a set temperature limit, a reduced first speed of the drive motor of the compressor is calculated, reducing the load of the electric drive motor, which then is controlled to operate with this first calculated speed, and if, additionally, the temperature of the electric power supply is above a set temperature limit, then, the first calculated speed of the electric drive motor is recalculated to a second calculated speed which is lower than first calculated speed and the electric drive motor is controlled to operate with the second calculated speed, until the pressure in air system reservoir reaches a set cut off pressure level.

Further, the electric drive motor can be controlled by the controller in such a way, that, if the electric drive motor is in an offload mode for a time period longer than a set or predefined time period, then the electric drive motor is started and controlled to operate with a set or calculated speed until the pressure in the air system reservoir reaches a cut off pressure level.

According to another embodiment, the electric drive motor is controlled by the controller in such a way, that if the wetness level in the air system reservoir is above a predefined or set wetness level limit, then the electric drive motor of the compressor is stopped.

Preferably, the electric drive motor is controlled by the controller in such a way, that if the ambient temperature is below a set or predefined temperature, then the electric drive motor is controlled to start and run at a set or calculated speed until the pressure level in air system reservoir has reached a cut off pressure level.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
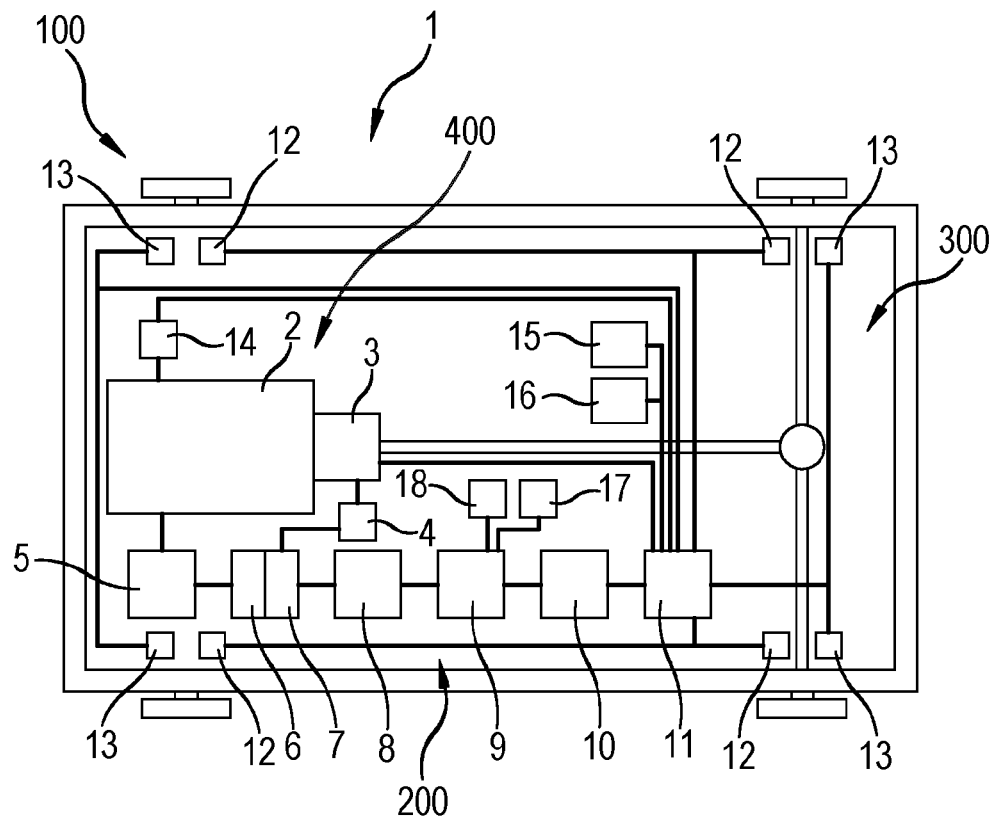
FIG. 1 is a schematic illustration of a vehicle chassis of a commercial vehicle with a compressed air system according to a preferred embodiment.

Referring now to the drawings and in particular to FIG. 1, a motor driven vehicle, particularly a motor driven commercial vehicle, which may be a vehicle with a conventional internal combustion engine only or a vehicle with a hybrid diesel-electric engine 2, 4, has a chassis 1, on which a compressed air system 100 comprising an air supply system 200 and an air utilizing system 300 is mounted. According to a preferred embodiment, the commercial vehicle is driven by a drivetrain 400 comprising a hybrid diesel-electric engine 2, 4 and a transmission 3.

The air utilizing system 300 includes air utilizing components that contribute to a consumption of air, such as an air brake system 12, an air suspension 13, a transmission 3, a door opening system 15, a driver seat suspension 16, a pneumatic booster system 14, etc. The air brake system 12 of the commercial vehicle preferably has an active service brake, where the service brakes are activated by increasing the air pressure in service brake cylinders and where the service brake is released by decreasing the pressure in the service brake cylinders, and a passive parking brake, where the parking brake is activated by decreasing the air pressure in parking spring brake cylinders and where the parking brake is released by increasing the pressure in the parking spring brake cylinders to a level which equates to a parking brake release pressure.

Further mounted on the chassis is the drivetrain 400 of the vehicle including an internal combustion engine 2, and, according to the preferred embodiment, an electric motor 4 as the electric part of the hybrid diesel-electric engine 2, 4, as well as the transmission 3.

Figure 2:
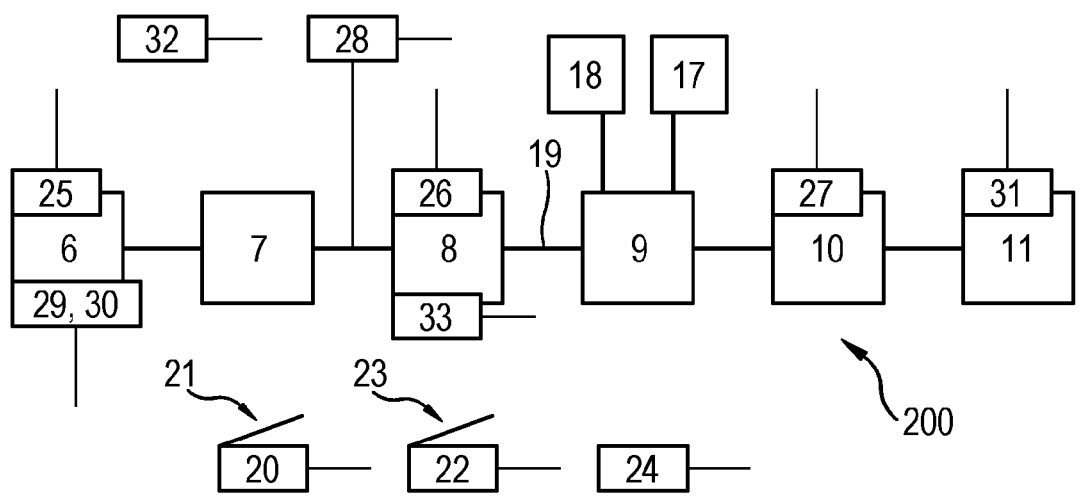
FIG. 2 is a schematic illustration of an air supply system of the compressed air system.

The air supply system 200 is illustrated separately in FIG. 2. It includes an electric power supply 6, for example, in the form of one or more batteries, an electronic control unit 7, with a microcomputer controlling an electric drive motor 8, variable in its speed. The variable speed electric drive motor 8 drives a compressor 9, particularly its crankshaft. The compressor 9 may be a rotary screw air compressor, delivering compressed air to an air processing unit 10 which may be an air dryer for air regeneration. The air dryer 10 is connected with an system air reservoir 11 which may include one or more separate air reservoirs, particularly one separate air reservoir for each air loop of the air utilizing system 300 such as an air suspension air loop, several air brake loops, a door opening air loop etc.

The vehicle drivetrain 400 is not coupled with the crankshaft of the compressor 9, which means that the compressor 9 can not be driven directly by the internal combustion engine 2 or here, in case of a hybrid engine 2, 4 driven vehicle, directly by the electric motor 4 of the hybrid engine 2, 4. Rather, the compressor 9 is operated independently from the vehicle's drivetrain 400, as the air supply system 200 according to FIG. 2 is a standalone system.

The air system compressor 9 is driven by the electric drive motor 8 which is controlled by control unit 7. The electric power to actuate the control unit 7 as well as the electric drive motor 8 of the compressor 9 is delivered by the electric power supply 6. The electric power supply 6, particularly in the form of a battery, is charged here by a stand alone electric generator 5, which preferable is mechanically driven by and coupled with the internal combustion engine 2, as can be seen from FIG. 1.

Alternatively, the electric generator 5 could be also driven by the electric motor 4 of the hybrid engine 2, 4. In another aspect, the electric power supply 6 of the air supply system 200 can be charged by the electric drive motor 8 of the compressor, when this electric drive motor 8 is operated in its generator mode.

The compressor 9 can cooperate with auxiliary systems such as a lubricating system 17 for lubricating moving parts of the compressor 9 and a cooling system 18 for cooling the compressor 9 in operation, if needed. Thus, the cooling system 18 serves as a device for cooling the compressor 9 and is controlled by the controller 7 to be preferably activated, when the temperature of the compressor 9 exceeds a critical temperature.

The electric power supply 6, the controller 7 and the electric drive motor 8 are connected by an electric power supply network 19 for conducting an electric current. Further, there is a signal line (not seen in FIG. 2) between the controller 7 and the electric drive motor 8 for transmitting control signals. This electric power supply network 19 also forms part of the air supply system 200.

Further, the controller 7 of the electric drive motor 8 receives electric signals from several sensors, among which are:

a sensor 20 for generating a signal representing an activation status of an accelerator pedal 21 of the hybrid engine 2, 4 of the vehicle, a sensor 22 for generating a signal representing an activation status of a brake pedal 23 of the air brake system 12 of the vehicle, a speed sensor 24 for generating a signal representing the speed of the vehicle, a temperature sensor 25 for generating a signal representing the temperature of the power supply 6, a temperature sensor 26 for generating a signal representing the temperature of the electric drive motor 8, a wetness sensor 27 for generating a signal representing the wetness of the air compressed by the compressor and delivered to the air processing unit 10, a current sensor 28 for generating a signal representing the current present in the electric power network 19 and, therefore, also representing the load of the compressor 9, a current sensor 29 and/or a voltage sensor 30 for generating a signal representing the status of the electric power supply 6, a pressure sensor 31 for generating a signal representing the pressure in the air system reservoir 11, an ambient temperature sensor 32 for generating a signal representing the ambient temperature outside the vehicle, and a speed sensor 33 for generating a signal representing the rotational speed of the electric drive motor 8.

The aforementioned sensors are connected by electric signal lines with the controller 7, as indicated in FIG. 2, to feed controller 7 with the respective signals.

Further, the controller 7 of the electric drive motor 8 has an internal clock, such that signals representing the running time of the air compressor 9 can be generated and evaluated.

Preferably, at least one of the aforementioned signals and data are delivered to the controller 7 of the electric drive motor 8 of the compressor to be used as a basis to control the speed of the electric drive motor 8 of the compressor 9. In other words, the determination or calculation of the speed of the electric drive motor 8 depends upon at least one of those signals.

Also, the total air consumption level of the compressed air system 100 can determine the speed of the electric drive motor 8 in order to target low power consumption of the electric power supply 6 of the vehicle 1, while maintaining the demand pressure of the compressed air system 100. The components that contribute to the air consumption of the compressed air system 100 are the components of the air utilizing system 300 such as the air brake system 12, the air suspension 13, the transmission 3, the door opening system 15, the driver seat air suspension 16, the pneumatic booster system 14, and the air processing unit 10. But also leakage or the regeneration process can influence the air consumption in the compressed air system 100.

In the following, several modes for operating the compressed air system 100, particularly the air supply system 200 are presented.

1. Air Consumption Mode

An observation of the air consumption of the compressed air system 100 is based on the mass balance of the compressed air system 100. The air consumption of the compressed air system 100 of the vehicle is calculated as follows:

$$\frac{dp}{dt} = \frac{R_{air} \cdot T_{amb}}{V_{system}} \cdot \left( \frac{dm_{comp}}{dt} - \frac{dm_{cons}}{dt} \right) \Rightarrow \underline{\frac{dm_{cons}}{dt} = \frac{dm_{comp}}{dt} - \frac{dp}{dt} \cdot \frac{V_{system}}{R_{air} \cdot T_{amb}}}$$

where:

-continued $\dfrac{dm_{cons}}{dt}$ is the total air consumption of the compressed air system, $\dfrac{dm_{comp}}{dt}$ is the air flow rate delivered by the compressor 9, $\dfrac{dp}{dt}$ is the pressure gradient of the compressed air system, $V_{system}$ is the total volume of the compressed air system 100, $R_{air}$ is the specific gas constant of air, and $T_{amb}$ is the ambient temperature.

Compressor flow-rate maps are known. To cover the consumption of the compressed air system 100 of the vehicle, the required speed of the drive motor 8 of the compressor 9 can be also calculated based on the flow-rate maps. Finally, the speed of the drive motor 8 can be calculated as a function of the air consumption and pressure level in the compressed air system 100.

2. Start-Up Filling Mode

Figure 3:
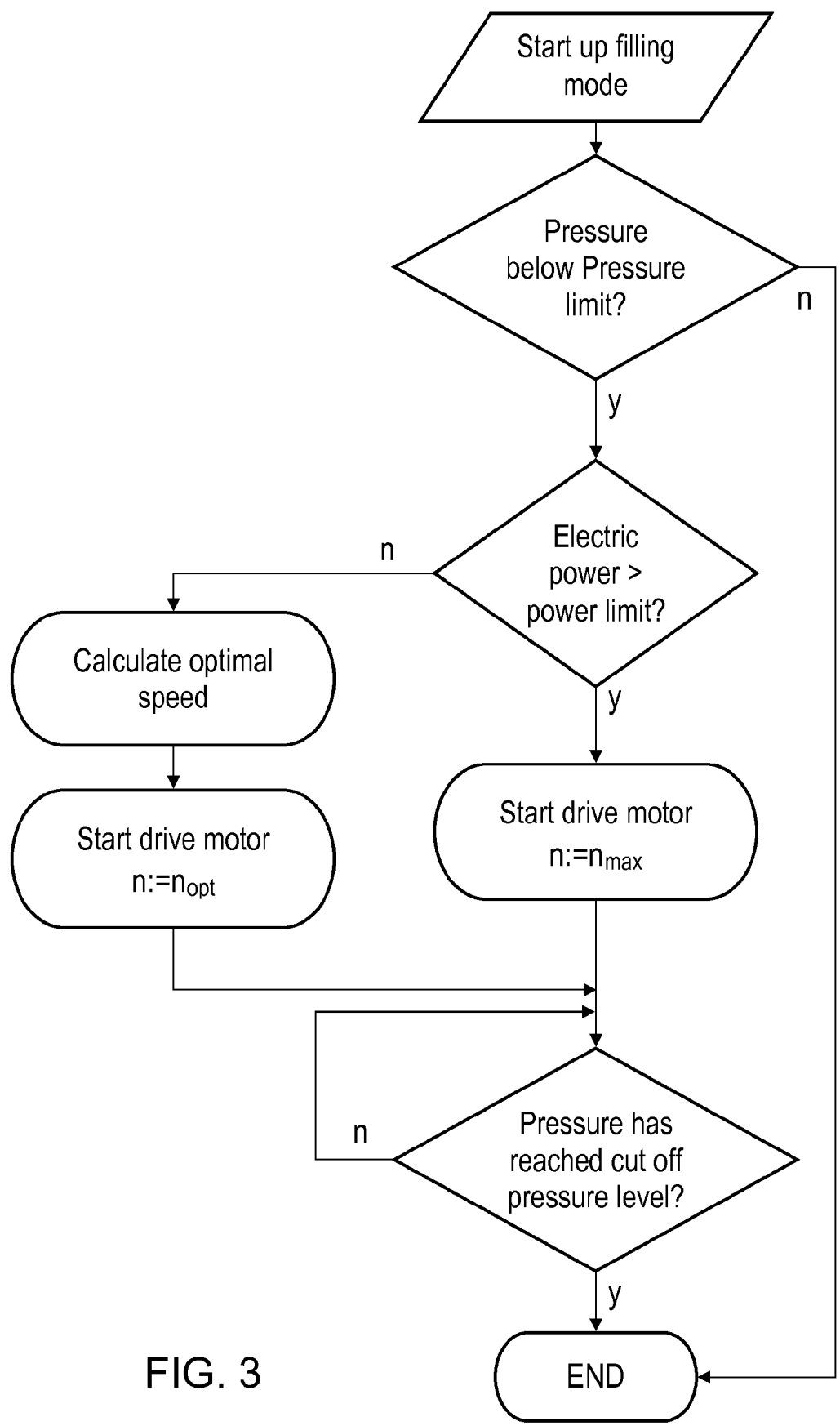
FIG. 3 is a flow chart illustrating a start up filling mode.

When starting the commercial vehicle, the pressure level in the air reservoir 11 is normally lower than a set minimum pressure level, particularly lower than the parking brake release pressure of the passive parking brake. If then, the battery charging level is higher than a predefined value, the start-up filling mode can also be activated in case of a stopped internal combustion engine 2. The start-up filling mode is illustrated in FIG. 3.

The speed of the electric drive motor 8 is controlled by the controller 7 such that, if the pressure level in the air reservoir 11 is below a set pressure limit and if the power status of the electric power supply 6 reaches or exceeds a set power status limit, then the electric drive motor 8 is operated with its maximum speed until the pressure level in the air reservoir 11 reaches a set cut off pressure level.

Alternatively, if the pressure level in the air reservoir 11 is below a set pressure limit and if the power status or charge status of the electric power supply 6 is below the set power status or charge limit, then the electric drive motor 8 is operated with a set speed between zero speed and its maximum speed, until the pressure level in the air reservoir 11 reaches the cut off pressure level.

3. Maximum Power Mode

Figure 4:
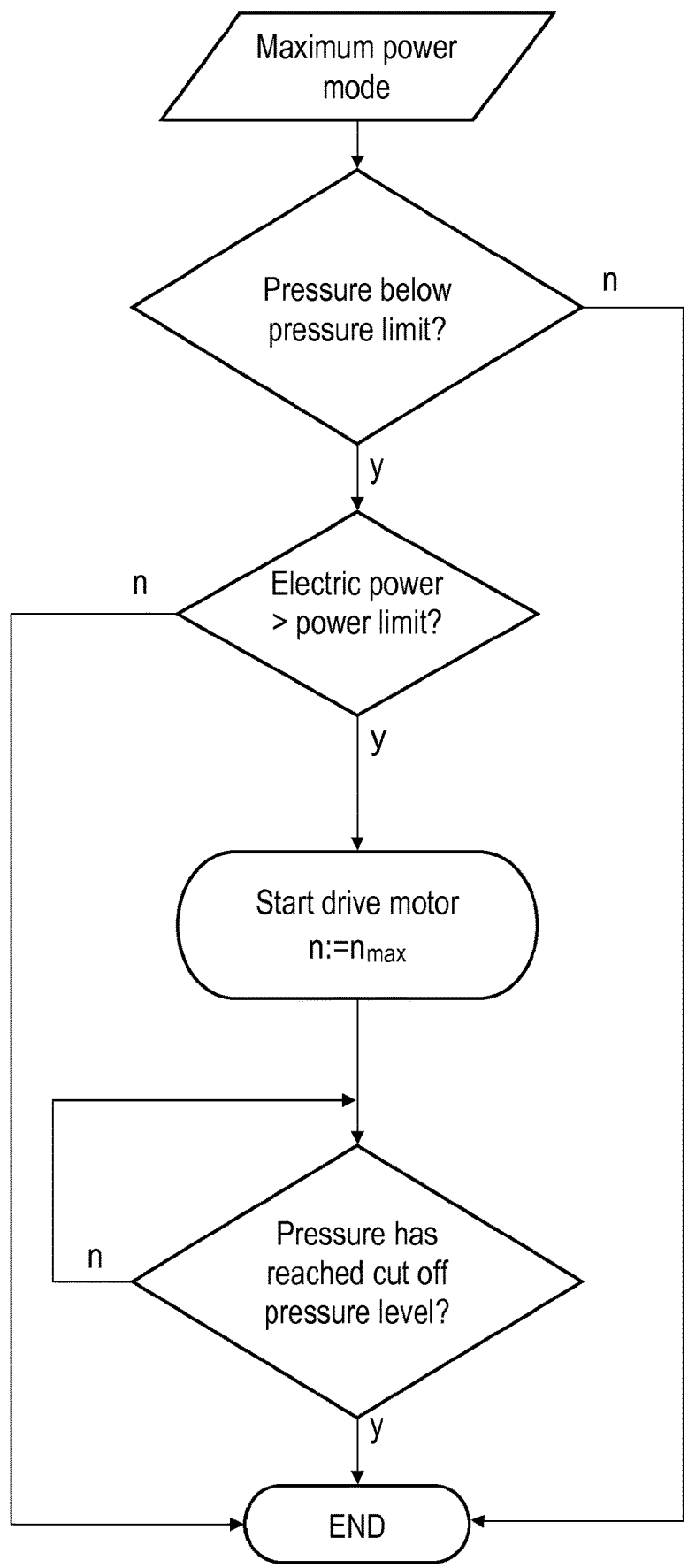
FIG. 4 is a flow chart illustrating a maximum power mode.

In case of a low pressure level in the air system reservoir 11, the electric drive motor 8 of the compressor 9 is controlled to operate at its highest speed to cover high air consumption, if the internal combustion engine b 2 is operating. The maximum power mode is illustrated in FIG. 4.

If the air system pressure level is below a set cut pressure level, and the battery and power stage 6 status is ok, then, the drive motor 8 of the compressor 9 is started and controlled to work at its maximum speed until pressure level in the air system reservoir reaches the set cut off pressure level.

4. Optimal Power Mode

Figure 5:
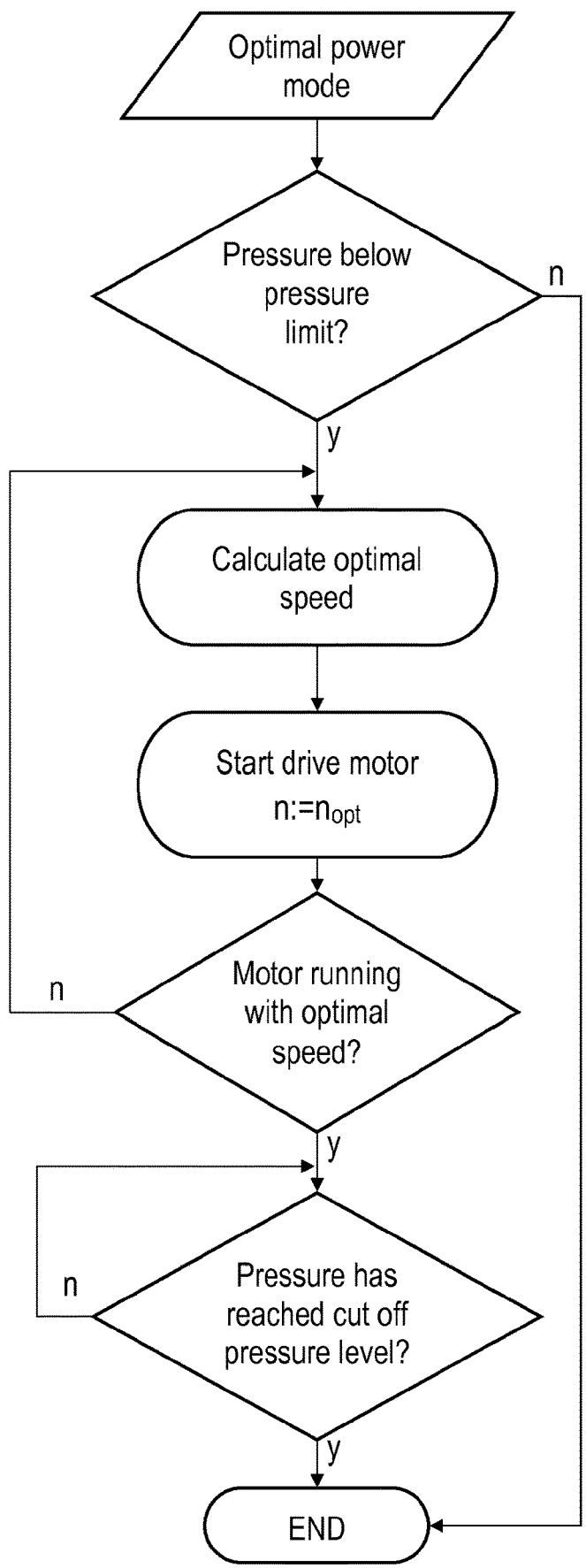
FIG. 5 is a flow chart illustrating an optimal power mode.

In case of low air consumption, the electric drive motor 8 of the compressor 9 is controlled to be driven at a calculated rotational speed considering the highest efficiency to minimize the power consumption of the electric power supply 6, fuel consumption and to extend the battery's lifetime. The optimal power mode is illustrated in FIG. 5.

The speed of the electric drive motor 8 is controlled by the controller 7 such that, if the pressure in the air system reservoir 11 is below a set pressure limit, then the electric drive motor 8 is controlled to operate with a speed calculated to cover the actual air consumption, until the pressure level in the air reservoir 11 reaches a set or predetermined cut off pressure level.

5. Overrun Mode

Figure 6:
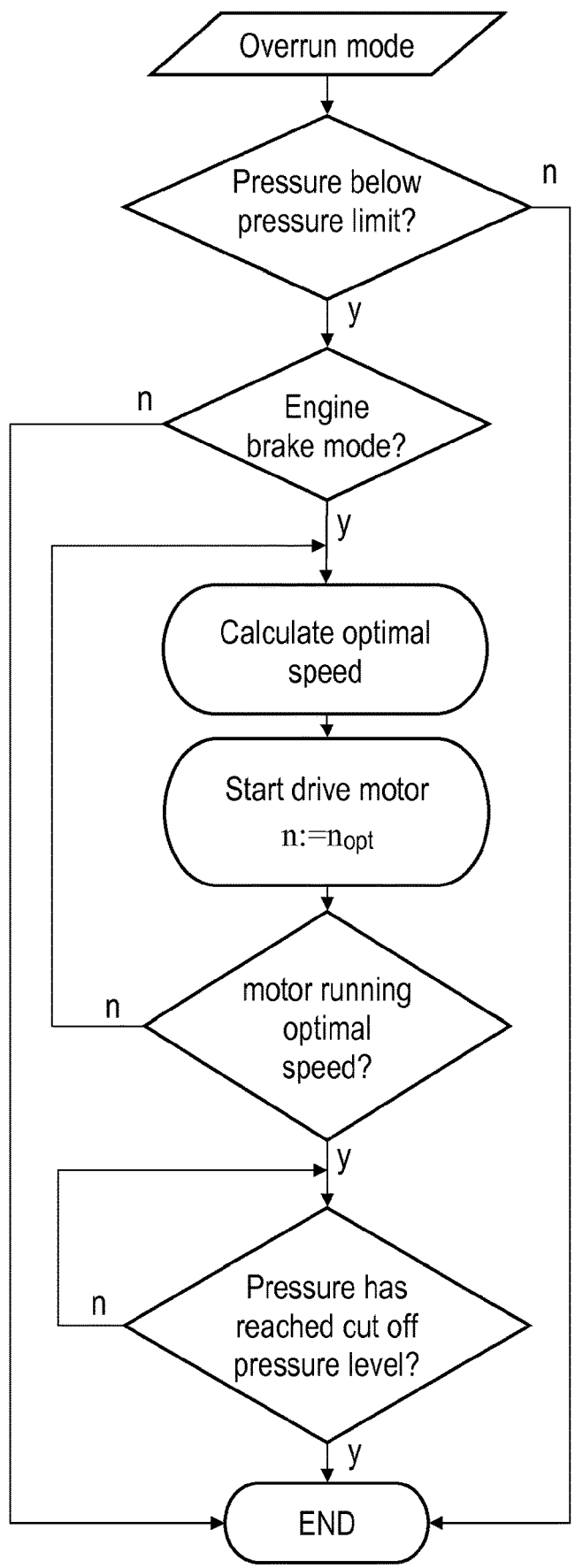
FIG. 6 is a flow chart illustrating an overrun mode.

In an engine brake mode, when the engine is used to produce a braking effect, e.g. for a retarder brake, the electric drive motor 8 of the compressor 9 is activated, if the battery level is above a predefined value. In this case, the air system reservoir 11 can be overfilled above a set cut off pressure level to store more energy in the pneumatic system. The overrun mode is illustrated in FIG. 6.

If the pressure in air system reservoir 11 is below a set cut off pressure and if the drive engine 2 of the vehicle works in an engine brake mode, e.g. in a retarder mode, then the electric drive motor 8 of the compressor 9 is started and controlled to work at a calculated speed until the pressure in the air system reservoir reaches the cut off pressure level of the overrun mode, which is higher than the normal cut off pressure level, in order to store more energy in the compressed air system 100.

6. Emergency Mode

Figure 7:
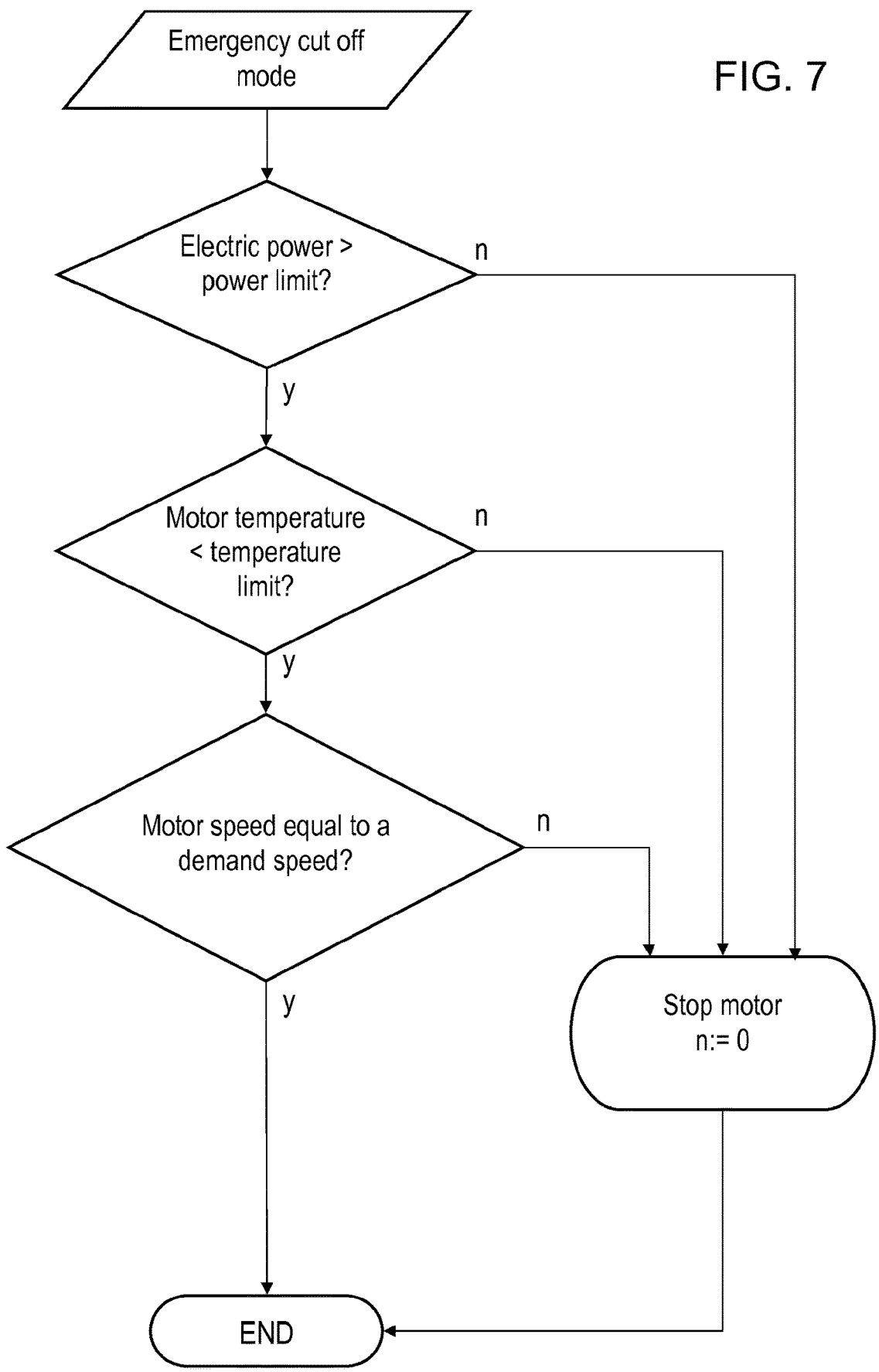
FIG. 7 is a flow chart illustrating an emergency mode.

The emergency mode covers a malfunction of the compressor 9, of the electric drive motor 8 and/or of the electric power supply 6. If at least one of those malfunctions occurs or is detected, the electric drive motor 8 of the compressor 9 will be stopped. The emergency mode is illustrated in FIG. 7.

If the power or charge status of the electric power supply 6 is below a set power status or charge limit, or, if the temperature of the electric drive motor 8 exceeds a set critical temperature limit, or, if the actual speed of the electric drive motor 8 of the compressor 9 is not equal to a demanded speed, then the electric drive motor 8 of the compressor 9 will be stopped.

7. Compressor Braking Mode

Figure 8:
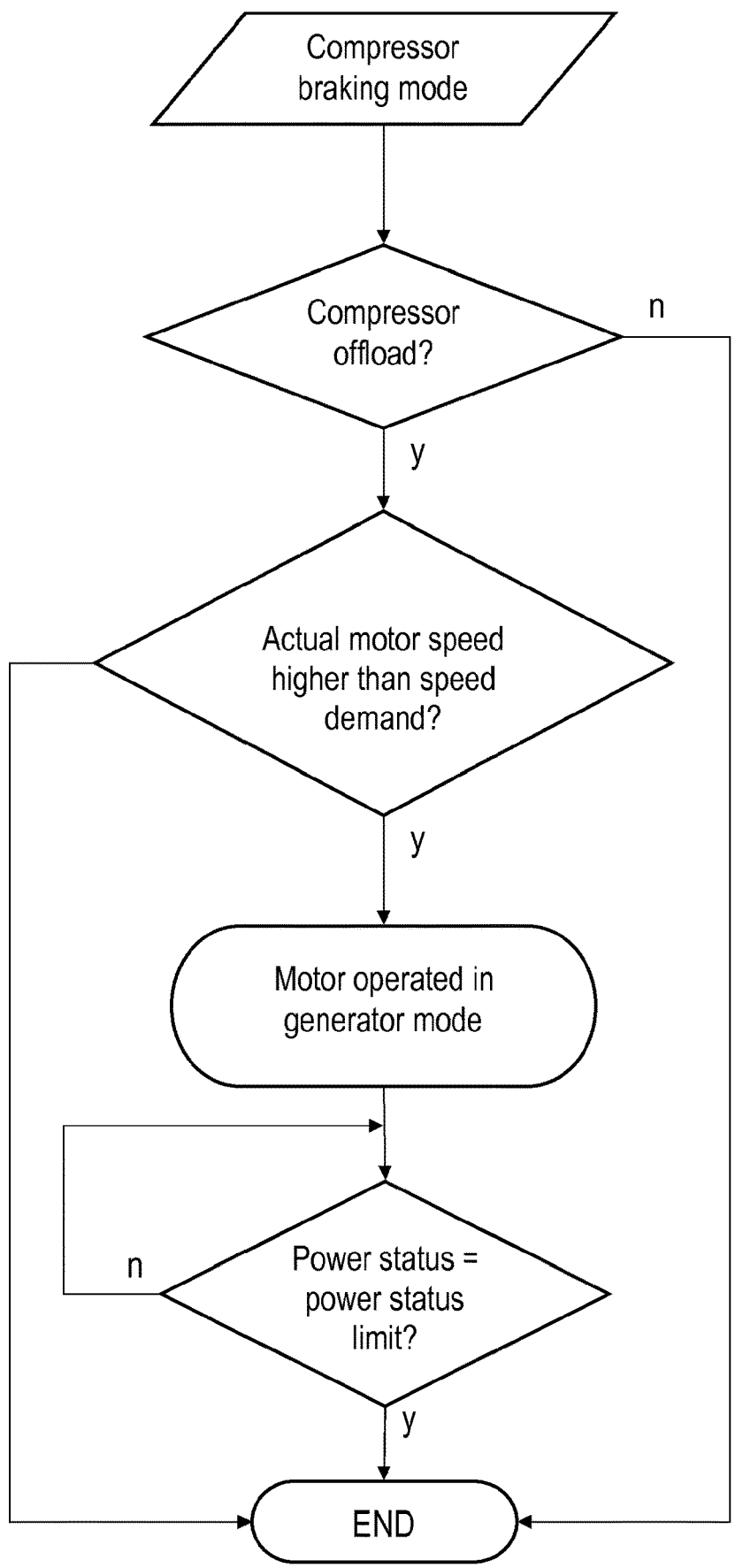
FIG. 8 is a flow chart illustrating a compressor braking mode.

When the compressor 9 is switched off or off-load, the electric drive motor 8 is operated in, or switched to, a generator mode to charge the electric power supply 6 during the off-time of the electric drive motor 8 and the coupled compressor 9. The electric energy obtained thereby is delivered by the electric power supply network 19 from the electric drive motor 8 to the electric power supply 6. This process is illustrated in FIG. 8.

If the compressor 9 is switched off-load and the actual speed of the electric drive motor 8 of the compressor 9 is higher than an actual speed demand for the electric drive motor 8, which is zero in this case, then the electric drive motor 8 is operated in, or switched into, a generator mode to charge the electric power supply 6 until a set or predetermined charge level of the electric power supply 6 is reached.

8. Overtake Mode

Figure 9:
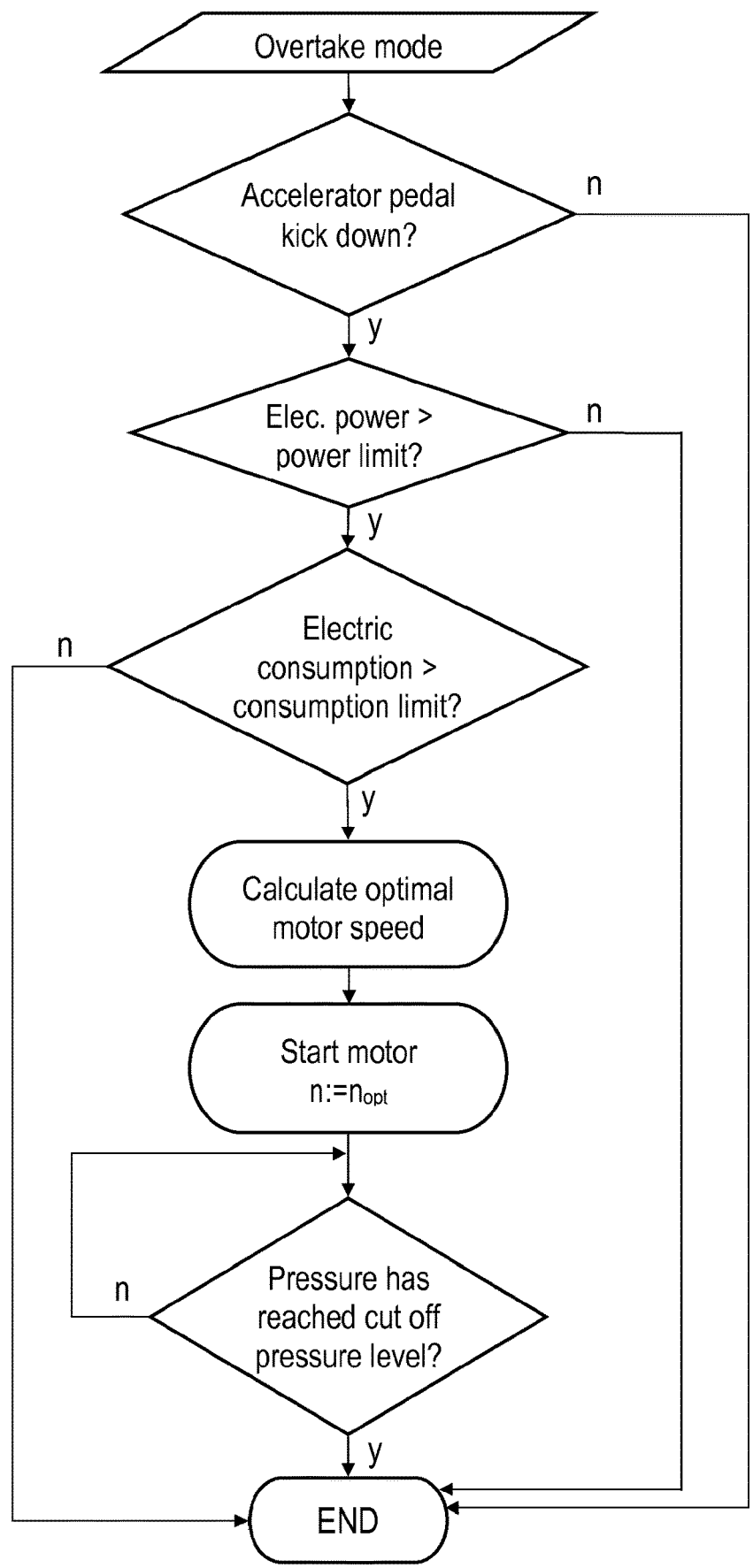
FIG. 9 is a flow chart illustrating an overtake mode.

If the driver initiates a high acceleration demand, e.g. in the form of a kick down of the accelerator pedal 21, and the electric drive 4 of the vehicle is also activated, the electric drive motor 8 of the compressor 9 is turned off or its speed reduced considering the high demand for electric power to decrease the degradation of the electric power supply 6, if the pressure level in air system reservoir 11 is above a set pressure value. This process is illustrated in FIG. 9.

If the accelerator pedal 21 of the engine 2 is kicked down and the charge status of the electric power supply 6 exceeds a set charge limit and the consumption of electric power is above a consumption limit, than the electric drive motor 8 of the compressor 9 is controlled to operate with a calculated speed lower than the maximum speed until the pressure in the air system reservoir 11 reaches a set cut off pressure level. A parameter representing the consumption of electric power or energy is preferably the current conducted in the electric consumer circuit(s).

9. Cold Operation Mode

Figure 10:
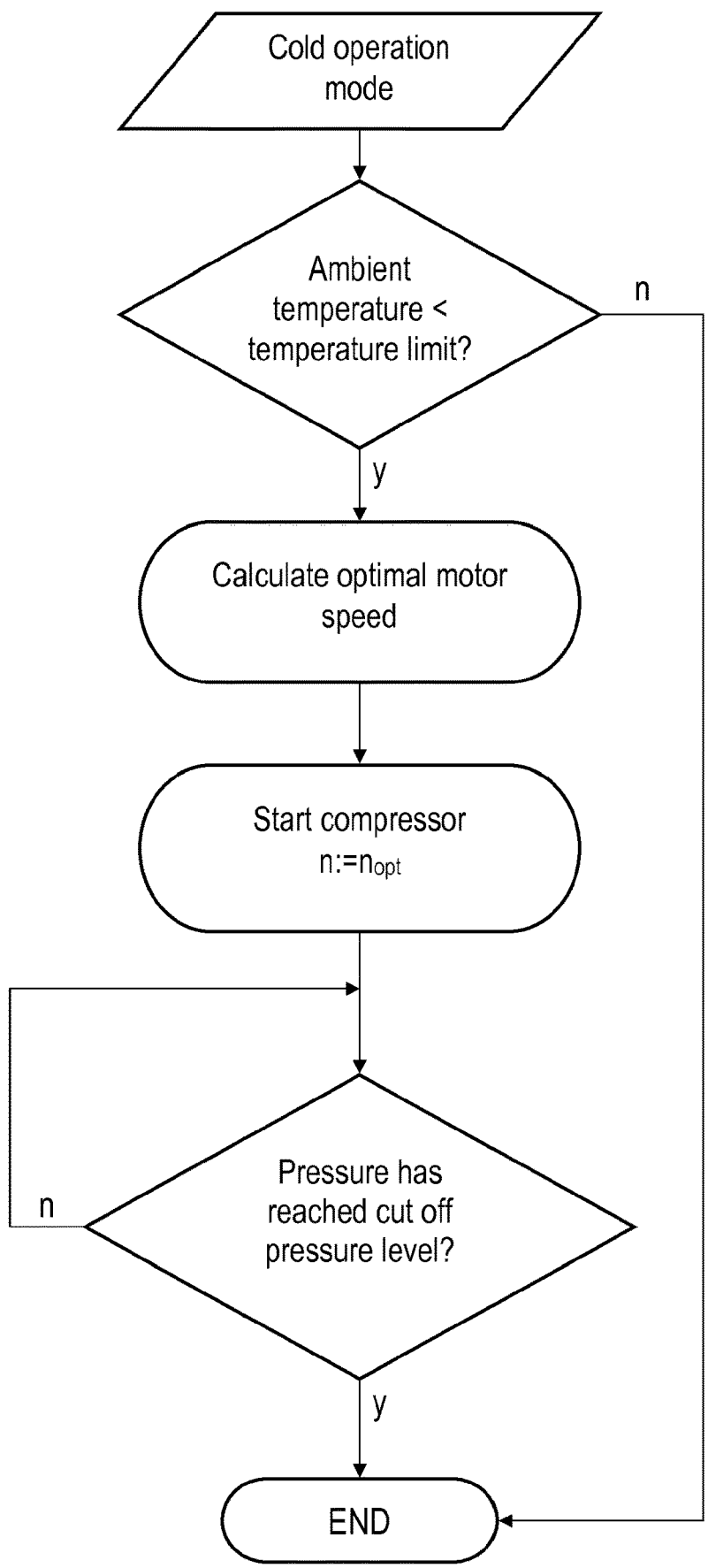
FIG. 10 is a flow chart illustrating a cold operation mode.

If the ambient temperature is below a set ambient temperature, a reduced speed of the electric drive motor 8 of the compressor 9 is applied if also the pressure level in the air system reservoir 11 is above a set pressure limit in order to conserve the electric energy of the electric power supply 6. This process is illustrated in FIG. 10.

If the ambient temperature is below a set ambient temperature, the electric drive motor 8 of the compressor 9 is started and controlled to operate with a set calculated speed until the pressure level in air system reservoir 11 reaches a cut off pressure level.

10. Load Reducing Mode

Figure 11:
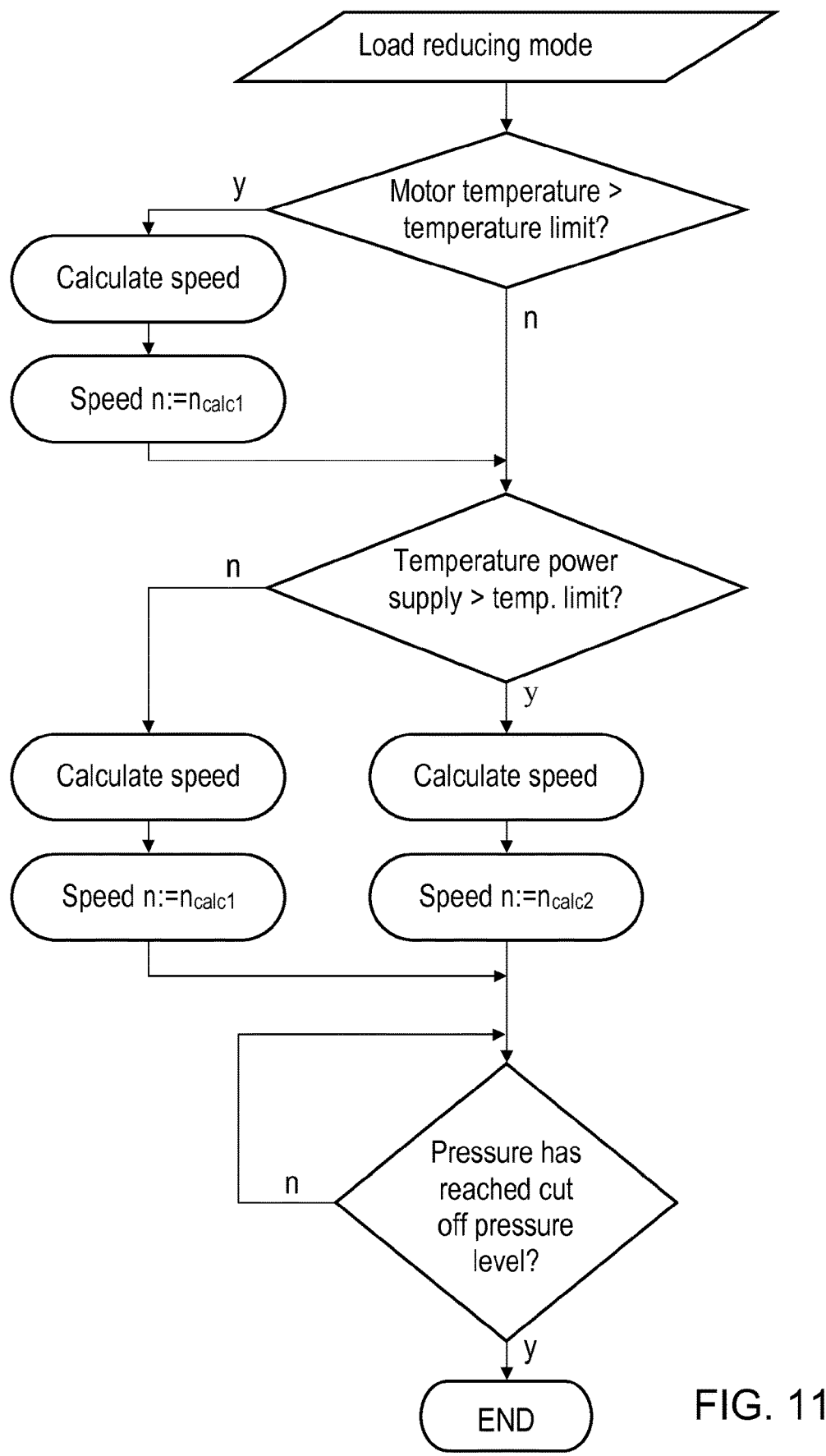
FIG. 11 is a flow chart illustrating a load reducing mode.

If the temperature of the electric drive motor 8, measured by the temperature sensor 26 and/or the temperature of the electric power supply 6, measured by the temperature sensor 25, exceeds a set temperature limit, respectively, then the speed of the electric drive motor 8 of the compressor 9 is reduced. This process is illustrated in FIG. 11.

If the temperature of the electric drive motor 8 is above a set temperature limit, a reduced first speed ncalc1 of the drive motor 8 of the compressor 9 is calculated, reducing the load of the electric drive motor 8, which then is controlled to operate with this first calculated speed ncalc1. If, additionally, the temperature of the electric power supply 6, measured by temperature sensor 25, is above a set temperature limit, then the first calculated speed ncalc1 of the electric drive motor 8 of the compressor 9 will be recalculated to a second calculated speed ncalc2, which is lower than first calculated speed ncalc1. The electric drive motor 8 of the compressor 9 is controlled to run with the second calculated speed ncalc2 until the pressure in air system reservoir 11 reaches a set cut off pressure level.

11. Refresh Mode

Figure 12:
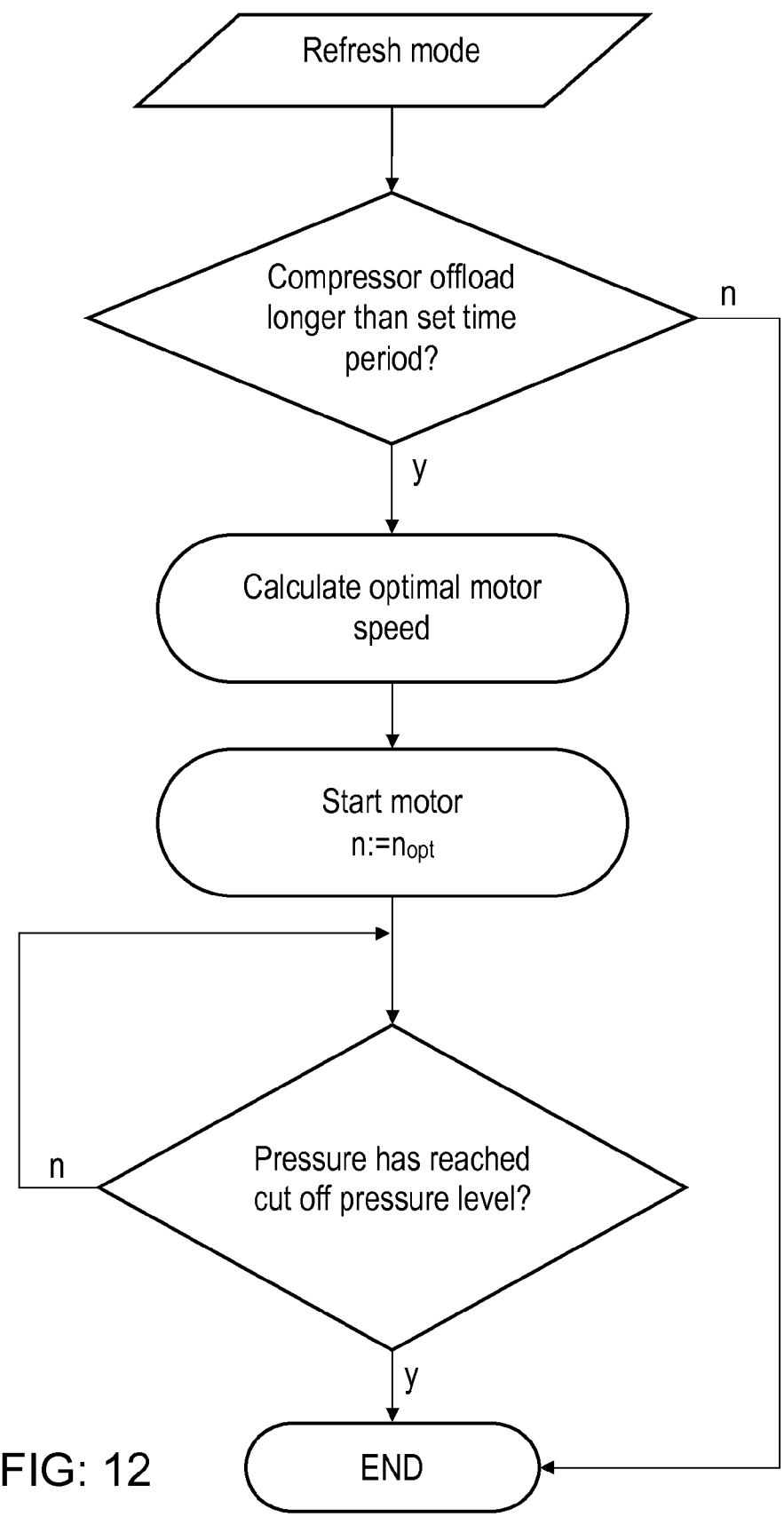
FIG. 12 is a flow chart illustrating a refresh mode.

In the case where the electric drive motor 8 of the compressor 9 is stopped for a predefined or set time period, the electric drive motor 8 of the compressor 9 is restarted to establish a lubrication refresh activity. This process is illustrated in FIG. 12.

If the electric drive motor 8 of the compressor 9 is in an offload mode for a time period longer than a set or predefined time period, then the electric drive motor 8 is started and controlled to run or operate with a set or calculated speed until the pressure in air system reservoir 11 reaches a cut off pressure level.

12. Intermediate Regeneration Mode

Figure 13:
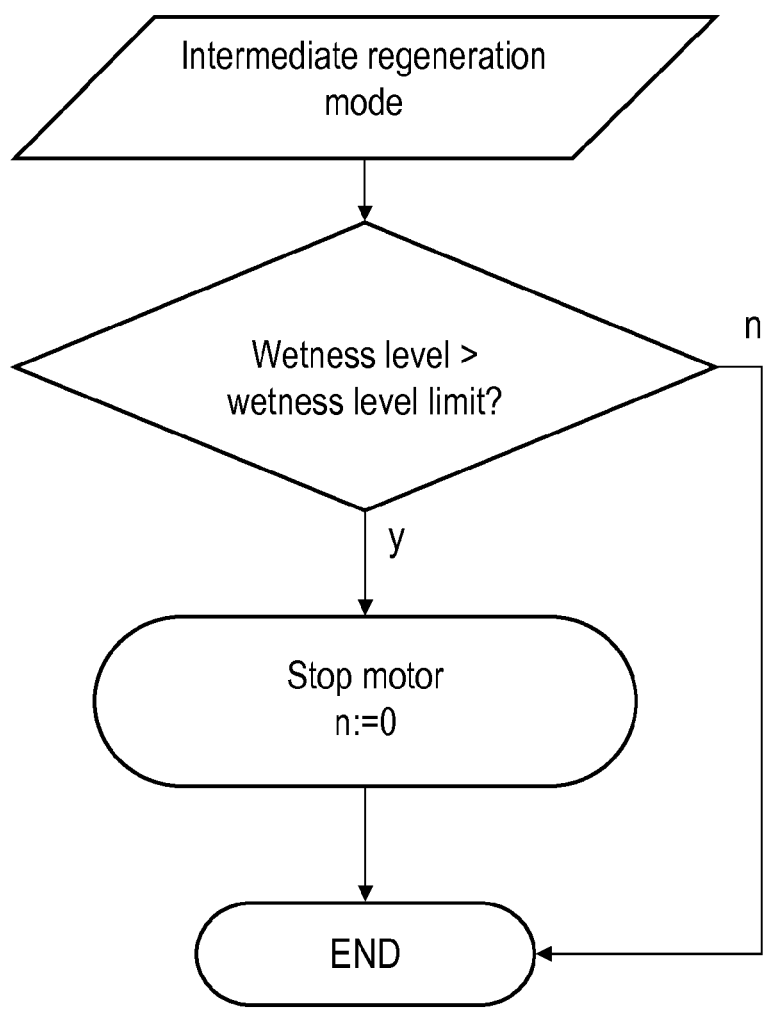
FIG. 13 is a flow chart illustrating an intermediate regeneration mode.

If the level of wetness in the air processing unit 10 and/or in the air system reservoir 11 exceeds a predefined or set wetness level, then the electric drive motor 8 of the compressor 9 is stopped if the electric drive motor 8 is in a load mode and a regeneration phase has been started to decrease the wetness level in the air processing unit 10 or in the air system reservoir 11. This mode is illustrated in FIG. 13.

If the wetness level in the air processing unit 10 and/or in the air system reservoir 11 is above a predefined or set wetness level limit, then the electric drive motor 8 of the compressor 9 is stopped.

13. Anti-Freeze Mode

Figure 14:
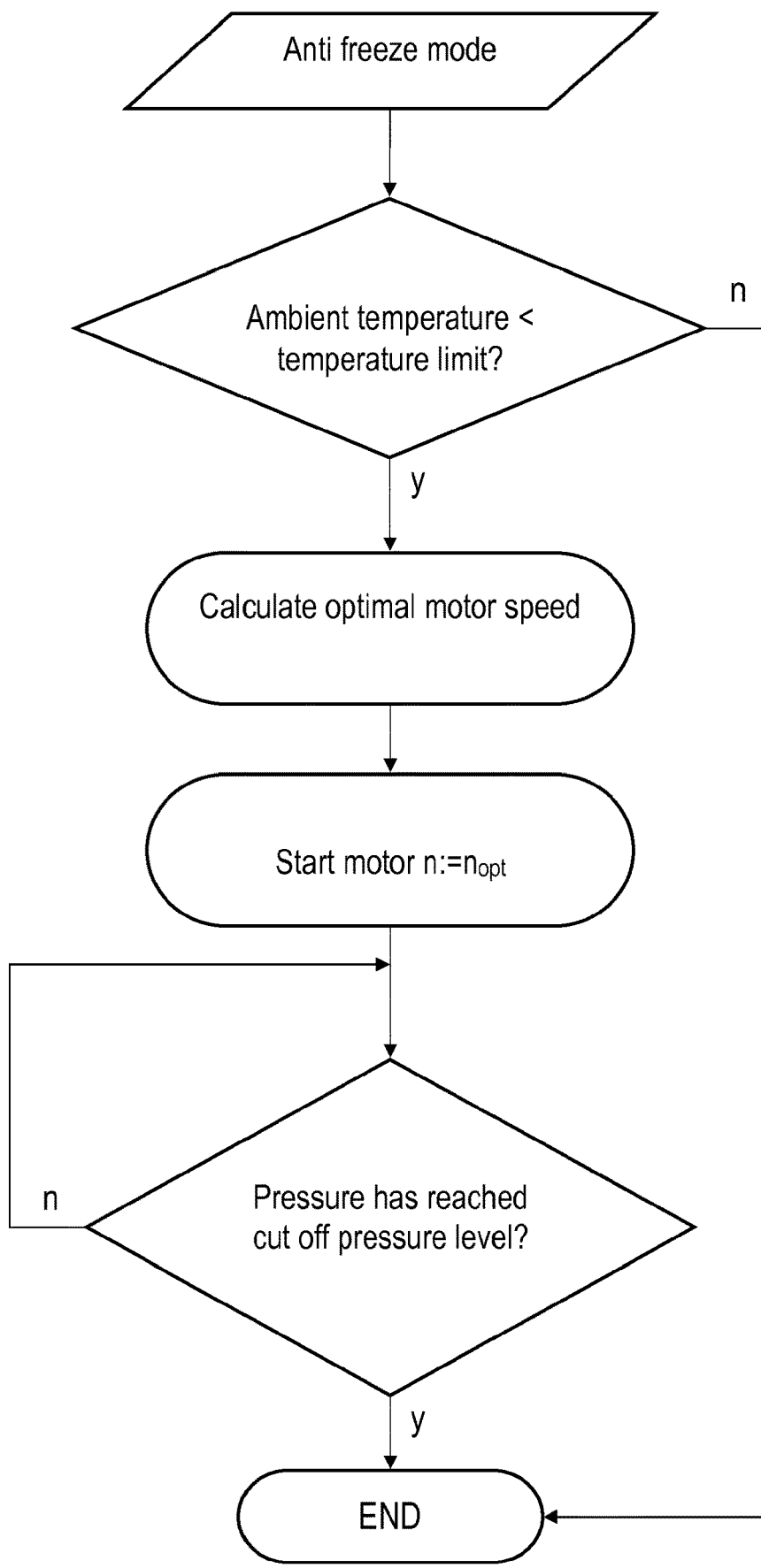
FIG. 14 is a flow chart illustrating an anti freeze mode.

If the ambient temperature is below a set or predefined ambient temperature level and the electric drive motor 8 of the compressor 9 is stopped during a predefined or set time period, then the electric drive motor of the compressor 9 is started, to prevent freezing in a discharge line by delivering warm air into the discharge line by the compressor 9. This mode is illustrated in FIG. 14.

If the ambient temperature is below a set or predefined temperature, the electric drive motor 8 is controlled to start and operate with a set or calculated speed until the pressure level in air system reservoir 11 has reached a cut off pressure level.

With this, an off engine compressor drive is achieved to enable a high speed operation of the compressor even in case of an idling drive engine 2, 4 of the vehicle. Thus, the compressor 9 can be made smaller. Further, power consumption is decreased, enabling use of a smaller battery and providing a longer battery lifetime.

List of reference numerals 1 vehicle
2 internal combustion engine
3 transmission
4 electric motor
5 generator
6 electric power supply
7 controller
8 electric drive motor
9 air system compressor
10 air processing unit
11 air system reservoir
12 air brake system
13 air suspension system
14 pneumatic booster system
15 door opening system
16 driver seat air suspension
17 lubricating system for the compressor
18 cooling system for the compressor
19 electric power supply network
20 sensor
21 accelerator pedal
22 sensor
23 brake pedal
24 speed sensor
25 temperature sensor
26 temperature sensor
27 wetness sensor
28 current sensor
29 current sensor
30 voltage sensor
31 pressure sensor
32 ambient temperature sensor
33 speed sensor
100 air compressed system
200 air supply system
300 air utilizing system
400 drivetrain The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A compressed air system for a motor vehicle with an air supply system, an internal combustion engine and a passive parking brake, which is activated by decreasing pressure in parking spring brake cylinders and is released by increasing pressure in the parking brake cylinders to a parking brake release pressure, comprising:

an electric drive motor, which is controllable for variable speed;

an air compressor coupled to be driven by the electric drive motor;
an electric power supply for supplying electric power to the electric drive motor;
at least one air reservoir connected with said air compressor to receive air from the air compressor;
an air utilization system connected to said at least one air reservoir to receive air from said at least one air reservoir; and
a controller to control the speed of the electric drive motor,
wherein
    the controller is configured to control the electric drive motor to determine the speed of the electric drive motor based upon a signal representing a status of the electric power supply and upon a signal representing a pressure in the at least one air reservoir, and
    when starting the vehicle or when the internal combustion engine of the vehicle is in a stopped status, a setup filling mode is activated, where the speed of the electric drive motor is controlled by the controller such that
        if the pressure in the at least one air reservoir is equal to or higher than the parking brake release pressure of the passive parking brake of the vehicle, the set up filling mode is stopped,
        if the pressure in the at least one air reservoir is lower than the parking brake release pressure, and if a power level of the electric power supply reaches or exceeds a predetermined power level limit, the electric drive motor is operated at a maximum electric drive motor speed until the pressure in the at least one air reservoir reaches a predetermined cut off pressure, and the set up filling mode is stopped, or
        if the pressure in the at least one air reservoir is below the parking brake release pressure of the passive parking brake of the vehicle, and if the power level of the electric power supply is below the predetermined power level limit, the electric drive motor is operated with a speed between zero speed and the maximum electric drive motor speed until the pressure level in the at least one air reservoir reaches the cut off pressure, and the set up filling mode is stopped.

2. The compressed air system for a motor vehicle according to claim 1, wherein the speed of the electric drive motor is determined based upon at least one function and/or upon at least one look-up table, where at least one of the signal representing a status of the electric power supply and the signal representing a pressure in the at least one air reservoir signals a)-h) is an input variable for the at least one function and/or the least one look-up table.

* * * * *